US007523077B2

(12) United States Patent
Wu et al.

(10) Patent No.: US 7,523,077 B2
(45) Date of Patent: Apr. 21, 2009

(54) KNOWLEDGE REPOSITORY USING CONFIGURATION AND DOCUMENT TEMPLATES

(75) Inventors: Yuh-Cherng Wu, San Jose, CA (US); Hamid Moghaddam, Osterburken (DE); Christian Haas, Heidelberg (DE)

(73) Assignee: SAP Aktiengesellschaft, Walldorf ( * ) Notice: Subject to any disclaimer, the term of this patent is extended or adjusted under 35 U.S.C. 154(b) by 84 days.

(21) Appl. No.: 11/178,015

(22) Filed: Jul. 8, 2005

(65) Prior Publication Data
US 2007/0094191 A1 Apr. 26, 2007

(51) Int. Cl.
*G06N 5/00* (2006.01)
(52) U.S. Cl. .......................................... 706/12; 706/45
(58) Field of Classification Search .................. 706/12, 706/45, 47; 707/102; 709/229
See application file for complete search history.

(56) References Cited
U.S. PATENT DOCUMENTS

| | | | | |
|---|---|---|---|---|
| 6,477,565 | B1 * | 11/2002 | Daswani et al. ............. | 709/217 |
| 6,591,272 | B1 * | 7/2003 | Williams .................... | 707/102 |
| 6,633,910 | B1 * | 10/2003 | Rajan et al. ................. | 709/224 |
| 6,684,188 | B1 * | 1/2004 | Mitchell et al. ............... | 705/3 |
| 6,697,824 | B1 * | 2/2004 | Bowman-Amuah ......... | 709/229 |
| 6,714,939 | B2 * | 3/2004 | Saldanha et al. ............. | 707/102 |
| 7,246,164 | B2 * | 7/2007 | Lehmann et al. ............ | 709/225 |

OTHER PUBLICATIONS

R.D. Rolland, "The Essence of Databases", *Essence of Computing*, pp. 1-38 (1998).

"Adobe® Intelligent Document Platform for IBM® WebShere®", *Developer Overview, Adobe Systems Inc.* (Jun. 2004).

Craven et al. "Learning to Construct Knowledge Bases From The World Wide Web," *Artificial Intelligence*, 2000, Vol. 118, pp. 69-113.

Hacid et al. "A Database Approach for Modeling and Querying Video Data," *IEEE Transactions on Knowledge and Data Engineering*, Sep./Oct. 2000, vol. 12, No. 5, pp. 729-750.

J. Sukarno Mertoguno, "Distributed Knowledge-Base: Adaptive Multi-Agents Approach," *International Journal on Artificial Intelligence Tools*, 1998, vol. 7, No. 1, pp. 59-70.

McKay, "Kflow Knowledge Management: Built to Leverage the Way We Think", *CIRI Lab Inc.*, obtained from www.cirilab.com, document undated, 6 pages.

"Generate Run-Time Diagnostic Knowledge Base Tools", *Giordano Automation*, obtained at http://www.giordano.com/Products/genrun.htm, document said to be last modified on Dec. 28, 2001, printed from the Internet on Nov. 6, 2003, 1 page.

(Continued)

*Primary Examiner*—Wilbert L Starks, Jr.
(74) *Attorney, Agent, or Firm*—Fish & Richardson P.C.

(57) ABSTRACT

A method of designing a knowledge repository includes receiving, in a computer system, a first input to form a configuration template for a knowledge repository. The configuration template describes a class of knowledge entities to be included in the knowledge repository. There is received a second input identifying a document template to be used in displaying instances of the class of knowledge entities. The document template is selected from a predefined group of document templates. The document template is associated with the configuration template in the computer system. The thus designed knowledge repository may be provided with knowledge entities accordingly. Moreover, the created knowledge repository may be used to retrieve specific knowledge.

20 Claims, 6 Drawing Sheets

OTHER PUBLICATIONS

"Generate Run-Time Diagnostic Knowledge Base", *Giordano Automation*, obtained at http://www.giordano.com/help/sect7.htm, printed from the Internet on Nov. 6, 2003, 19 page.

"E-Service with Advanced Workflow", *Q-Link Technologies*, obtained from http://www.realmarket.com/news/qlinktech040500.html, printed from the Internet on Feb. 10, 2004, 2 pages.

"Business Process Modeling Language", obtained at http://www.bpmi.org/bpml.esp, printed from the Internet on Feb. 11, 2004, 1 page.

A. Arkin "Business Process Modeling Language (BPML)" 2002, obtained at http://www.bpml.org, 67 pages.

Screen shots of a Wizard Builder sold by SAP AG, 8 sheets.

Islam et al., "An Essential Design Pattern for Fault-Tolerant Distributed State Sharing", *Communication of the ACM*, XP-002326281, vol. 39, No. 10, Oct. 1996, pp. 65-74.

Gamma et al., *Design Patterns Elements of Reusable Object-Oriented Software*, XP002326333, Chapter 1, pp. vii-30, Published 1995.

Gamma et al., "Proxy Object Structural", XP-2326333A, pp. 207-217, Sep. 1999.

Gamma et al., "Observer Object Behavioral", XP-2326333A, pp. 293-303, Sep. 1999.

\* cited by examiner

KNOWLEDGE REPOSITORY USING CONFIGURATION AND DOCUMENT TEMPLATES

TECHNICAL FIELD

The description relates to a knowledge repository containing knowledge entities created using a configuration template and a document template.

BACKGROUND

Knowledge repositories can be used for capturing, managing and making available knowledge of any sort. They have been implemented to provide an automated help function to users, for example in form of a frequently asked questions (FAQ) feature or as a solution database, meaning a collection of problem descriptions associated with corresponding solution descriptions for the user to search. The problem descriptions may have attributes associated with them such that a user by searching can retrieve the relevant problem description (and thereby the associated solutions) for a given query. For example, the contents may be elicited from or extracted by experts in a particular domain.

Some existing knowledge repositories are designed for a specific computer system or a family of computer systems. As such, the repositories may be heavily influenced by the data model and attributes used in the system as a whole. For example, the solution database has been used in the R/3 system manufactured by SAP AG. In some instances, such a knowledge repository has been adapted for use with later-developed system components but the dependence on the original data model is nevertheless noticeable.

Existing knowledge repositories may lack flexibility for the customer of the system to define more attributes in addition to those that are predefined. This can be a disadvantage as there are considerable differences in the typical problem description between different business areas or industries. Also, with existing solutions it may be difficult to create separate and independent repositories within the same organization, particularly if they should have different structures and designs. As another example, many end users are comfortable using word processing tools, and the lack of integration with a well-known word processing solution may be a disadvantage. It may also be difficult to provide several knowledge repositories with a consistent and professional look and feel. It is believed that there is not a generic knowledge-repository solution that can flexibly work with different kinds of content and media for a variety of business applications.

SUMMARY

The invention relates to a knowledge repository that uses a configuration template and at least one document template.

In a first general aspect, a method of designing a knowledge repository comprises receiving, in a computer system, a first input to form a configuration template for a knowledge repository. The configuration template describes a class of knowledge entities to be included in the knowledge repository. A second input is received, identifying a document template to be used in displaying instances of the class of knowledge entities. The document template is selected from a predefined group of document templates. The method comprises associating the document template with the configuration template in the computer system.

In selected embodiments, the configuration template defines each of the knowledge entities as including a basic entity and a content entity, the content entity to be merged with the document template for displaying the knowledge entity. The basic entity may be defined as a template. The configuration template may further define each of the knowledge entities as including a processing entity to be used in managing an administrative process for the knowledge entity. The knowledge entities may be based on XML. The method may further comprise storing the instances of the class of knowledge entities in the knowledge repository and subsequently merging at least part of any stored knowledge entity with the document template for displaying the stored knowledge entity. At least one of the instances may result from a migration process from a legacy knowledge repository. The migration process may comprise retrieving contents from the legacy knowledge repository and persisting the retrieved contents in a format that can be merged with the document template for display. The method may further comprise receiving input to change the knowledge repository after storing the instances. The change may comprise modifying a structure of additional knowledge entities to be created, the modified structure comprising at least one selected from the group consisting of: a) adding a new sub-object to the knowledge entities; b) modifying an existing sub-object of the knowledge entities; and c) removing an existing sub-object from the knowledge entities. The change may comprise modifying a display format for the knowledge entities, the display format being modified by at least one selected from the group consisting of: a) modifying the document template; and b) substituting a new document template for the document template. The configuration template may describe a service connector for the knowledge entity, the service connector allowing use of one or more services in the computer system. The configuration template may describe a content connector for the knowledge entity, the content connector to be used in retrieving and persisting information of the knowledge entity. The configuration template may describe a template connector for the knowledge entity, the template connector configured for interfacing with the document template.

In a second general aspect, a system for managing a repository of knowledge entities comprises a knowledge repository having stored therein knowledge entities described by a configuration template. The knowledge entities have a format such that they can be merged with a document template for display. The system further comprises a knowledge management module that merges at least one of the knowledge entities with the document template.

In selected embodiments, the knowledge management module further retrieves additional information and uses it to create an additional knowledge entity for the knowledge repository, wherein the knowledge management module can merge the additional entity with the document template for display. The configuration template may describe at least one connector that the knowledge management module uses in managing the knowledge entities. The at least one connector may be selected from the group consisting of: a service connector allowing use of one or more services in the computer system, a content connector to be used in retrieving and persisting information of the knowledge entity, and a template connector configured for interfacing with the document template. The format may be XML.

Advantages of the systems and techniques described herein may include any or all of the following: Providing a document-based knowledge repository. Providing flexibility in the structure and content types of a knowledge repository. Providing that a user can choose a document template from a predefined group as a basis for the knowledge repository to be created. Providing a flexible use of third party-document templates. Providing flexible interfaces for the knowledge repository to use the different document templates. Providing a knowledge repository with improved handling of legacy knowledge entities. Providing a knowledge repository capable of holding various knowledge representations, e.g., case reasoning, multi-media with annotation, or protein sequences with 3-D structure. Providing a knowledge repository wherein knowledge content may be stored and modeled without fixed data models in a database management system.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
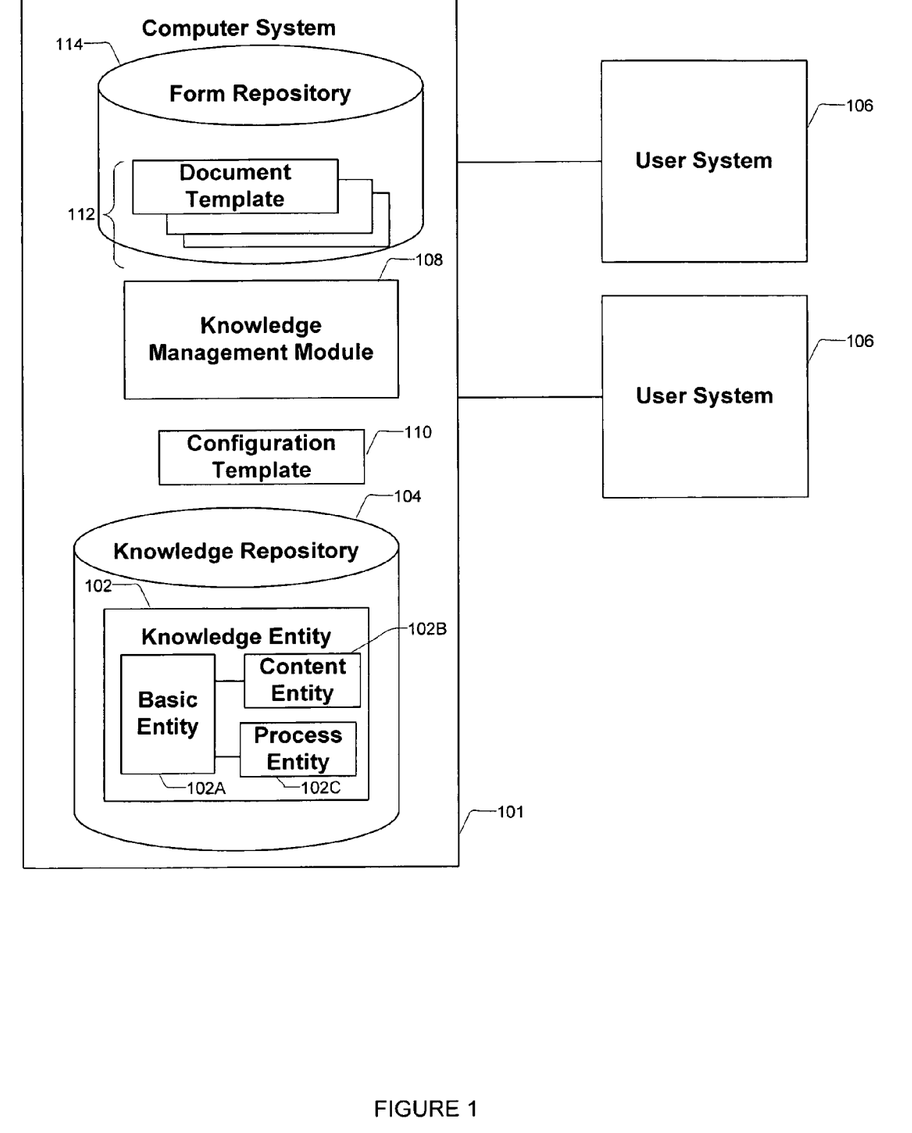
FIG. 1 is a block diagram of an exemplary system that manages a repository of knowledge entities.

FIG. 1 shows an environment 100 wherein a computer system 101 manages knowledge entities 102 in a knowledge repository (KR) 104. Here, only one knowledge entity 102 is shown for clarity. In some implementations, the knowledge entities 102 provide that the KR content is persisted as extensible markup language (XML) code. In such systems document visualization may be done by merging the XML code with a template during run-time.

The knowledge in the KR 104 may be of many different kinds. It may relate to the operation of the computer system 101, to the operation of other components (not shown) of the computer system 101, to the operation of other devices (not shown) in the environment 101, or to an auxiliary system or machine to name just a few examples. Users can access the computer system 101, and particularly the KR 104, through one or more user systems 106. For example, a user that has a problem with certain equipment may trigger a search of the KR 104 for information on how to resolve the problem. In the system, such a search may be initiated following receipt of a service request from the user, the service request containing a problem description such as a text of any length, product identification and information identifying where the problem or error has occurred.

The system 101 includes one or more of the KR 104. Each of the KRs 104 may contain multiple knowledge bases, for example an FAQ and a collection of problem descriptions associated with corresponding solution descriptions for the user to search.

The computer system 101 includes a knowledge management module (KMM) 108 that among other functions manages the KR 104 and interacts with the user(s). Upon the service request being generated in the environment 100, the KMM initiates the search for the responsive knowledge entity or entities in the KR. If at least one knowledge entity is identified in the search, it is forwarded to the user and the service request is thereafter closed. Upon reviewing the forwarded information, the user can try the proposed solution(s) to solve the problem.

The computer system 101 includes a configuration template 110 that defines the knowledge entities 102. The configuration template will be used when a new knowledge entity is added to the KR. Particularly, the configuration template describes a class of knowledge entities that can be created and included in the KR 104. For a given knowledge base, the configuration template decides which nodes, e.g., a problem or a solution, are needed for the knowledge base, and which document templates are used for which node. Here, the configuration template 110 defines each knowledge entity 102 in the KR 104 as having a basic entity 102A, one or more content entities 102B, and one or more process entities 102C. When there are several knowledge bases, each of them has a corresponding configuration template. Accordingly, designing the KR 104 in a particular situation may begin with creating or choosing the proper configuration template for the intended knowledge entities.

In a particular embodiment, contents in the new knowledge entities are XML documents. The XML documents may be saved as attachments in a content/document management system. The configuration template can specify how the contents of the XML is to be presented via a document template. The visualization of the knowledge entity contents, by merging the XML with a document template, is done during runtime. There may be a default template for visualization, and a customer can also interactively substitute another document template to present the same XML document, for example to show a detail solution for a technician, to show guided steps for a customer, or to show a summary for a report. Persisting the main content as XML provides independent visualization because the content can easily be merged with different document templates.

The computer system 101 includes one or more document templates 112 that define the structure of one or more knowledge entities. The configuration template 110 will have a document template associated with it so that the document template can be used in creating knowledge entities based on the configuration template. The document template 112 may include a collection of attribute definitions to be used in representing and organizing the knowledge content. The document template may consist of a form such as an Interactive Form available from Adobe Systems Inc. or a Word document template available from Microsoft Corp. The document template(s) 112 may be stored in a form repository 114 that is accessible to the KMM 108.

The knowledge entities contained in the KR 104 are objects that the computer system 101 recognizes. This means that the knowledge entities in separate KRs may share a common object model, whereas the knowledge-entity contents, defined by templates, can differ from one KR to another. The computer system 101 may include a default KR with pre-configured templates upon delivery. This may eliminate the need for additional configuration or customizing.

Figure 2:
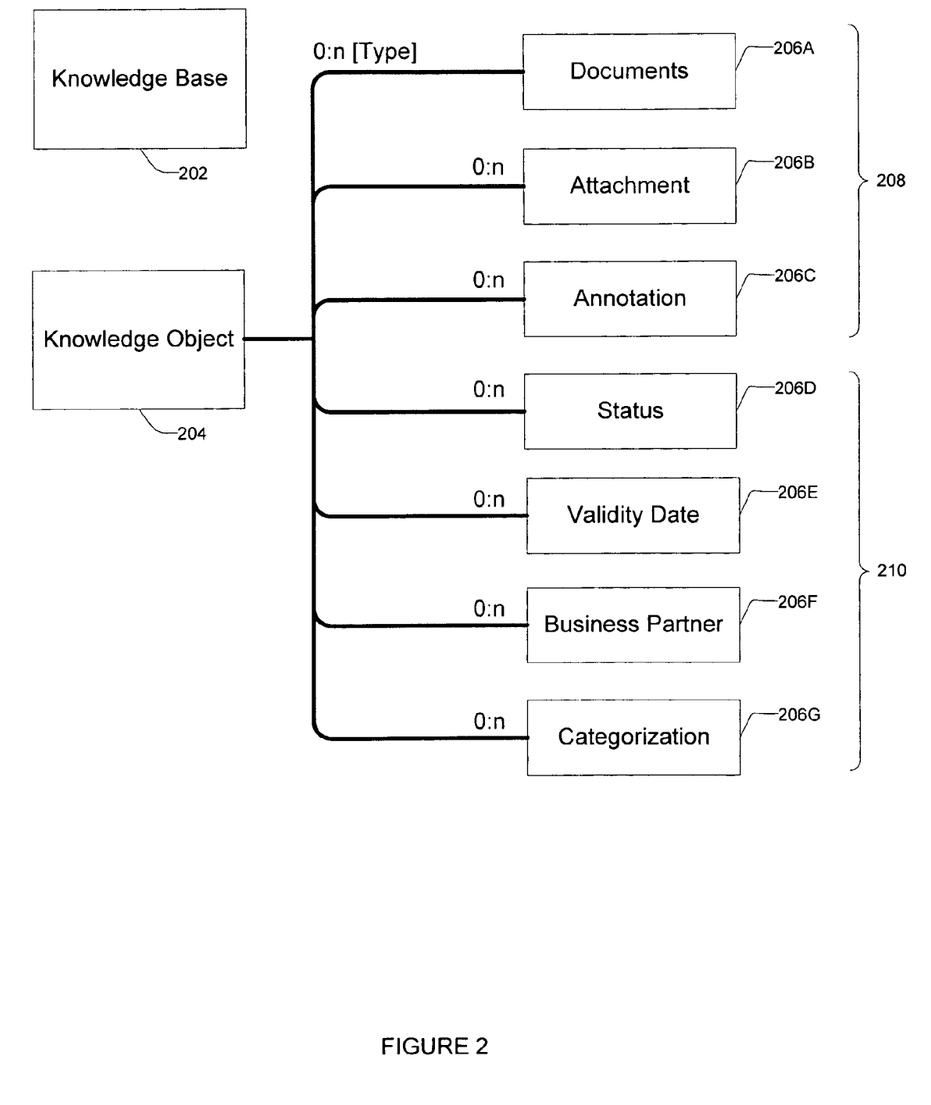
FIG. 2 is an example of an object model for knowledge entities.

FIG. 2 shows an exemplary object model for knowledge entities. The object model defines that a knowledge base 202 includes (or consists of) one or more knowledge objects 204. Each knowledge object has one node 204 of basic entity 102A, a set of nodes 208 of content entities 102B, and a set of nodes 210 of process entities 102C. The nodes signify that the knowledge object can have one or more sub-objects associated with it. The nodes 208 as content entities 102B has its content persisted using an attachment service. Data of the nodes 210 of process entities 102C will be used to manage administrative related processes and persisted in a data base model. The content related group stores the knowledge content of the knowledge object, and the process related group stores information related to administrative processes of the knowledge object.

Here, the knowledge object 204 may have a 0:n conditional association to a document node 206A. The conditional association is based on the document type. Different document types may represent different semantics of documents that can be assigned to a knowledge base. For example, a document of the type Problem indicates that the document node is a "Problem Document" in a Solution Database. The information to assign different types of documents to a knowledge base is stored in the configuration. The meta-information of the semantic information is used for attribute indexing and search from the user interface.

An attachment node 206B has a 0:n relationship to the knowledge object 204. The attachment can be any type(s) of files, but the document type stored in the attachment is fixed for the generic knowledge base environment. One difference between a document and an attachment is that the document node has semantic information specified in the document template and points to a specific knowledge base. An attachment can be any file(s) stored using the attachment service.

An annotation node 206C has a 0:n relationship to the knowledge object 204. The annotation is a special type of attachment, mainly containing text information. In the knowledge management life cycle the annotation can be used to support knowledge suggestions. For example, the annotation can contain any suggestions from users regarding the knowledge object and is used only during maintenance, not to hold knowledge contents.

A status node 206D, a validity date node 206E and a business partner node 206F correspond to respective intrinsic services provided by SAP's application platform.

A categorization node 206G corresponds to a categorization service that provides hierarchical categorization for the knowledge object.

The object model 200 is based on the assumption that the conditional association is available from the modeling of the system infrastructure. More or fewer nodes than shown in FIG. 2 can be used. Furthermore, a hierarchical structure can also be defined among the nodes. That is, children nodes can be defined if required for a specific business scenario. All the nodes that belong to the basic entity are supported through the connector framework which allows different connectors to be used and defined via the configuration template of each knowledge base.

The following are exemplary uses of the knowledge entities defined by the object model 200. A set of fixed types of nodes for documents may be created. For example, five nodes are created for types 1 to 5. Then, a customer can configure different knowledge bases 202 by mapping the different types to their own name of the node, e.g., Problem or Solution. The restriction is then that the number of nodes for a document with semantic information cannot exceed 5.

Some system infrastructure models do not provide a conditional association but may provide a projection feature for making a subset projection on to a parent business object. For example, the knowledge base 202 can be created as a projection to the knowledge object 204. The nodes of the knowledge base should be predefined in the parent business object, which will be the knowledge object. Based on this design, any nodes defined in a projection business object should be defined in the parent knowledge object.

One exemplary implementation of the object model 200 is the creation of knowledge entities that consist of problem descriptions and corresponding solution descriptions. Customers can specify, in the knowledge base configuration, 1) that problem and solution descriptions use two separate templates, or 2) that problem and solution descriptions are merged in one template, 3) that another entity and corresponding templates are to be created.

The problem description is a document of the type specified by the assigned document template 112 and describes one of the problems regarding which users are expected to search the KR 104. That is, the described problem is one that has been observed in the past or that can at least be expected to occur at some point. In some implementations, the problem contains a malfunction description in form of texts/images/multimedia information, as well as structured failure attributes.

The solution descriptions are documents of the type specified by the assigned document template 112 and describes at least one suggested solution for the problem with which the solution description is associated. In some implementations, the solution describes the steps to be taken, or fixes/procedures to be applied, to overcome the malfunction described in the problem description. The solution may contain the step(s) in form of a text as well as structured attributes.

Another way—in addition to the problem and solution description(s)—of connecting information to the specific basic entity 102A is through an attachment, as indicated by the attachment node 206B. An attachment is a generic node for all knowledge bases. Every knowledge entity in a knowledge base can link to one or more attachments. Any type of document, file or object that the computer system 101 handles can be attached to the basic entity as an information bearer.

In short, the configuration template 110 here defines the class of knowledge entities as consisting of a basic entity associated with a problem description, at least one solution description, and optionally one or more attachments. Accordingly, the content entity 102B includes specific instances of these components.

Figure 3:
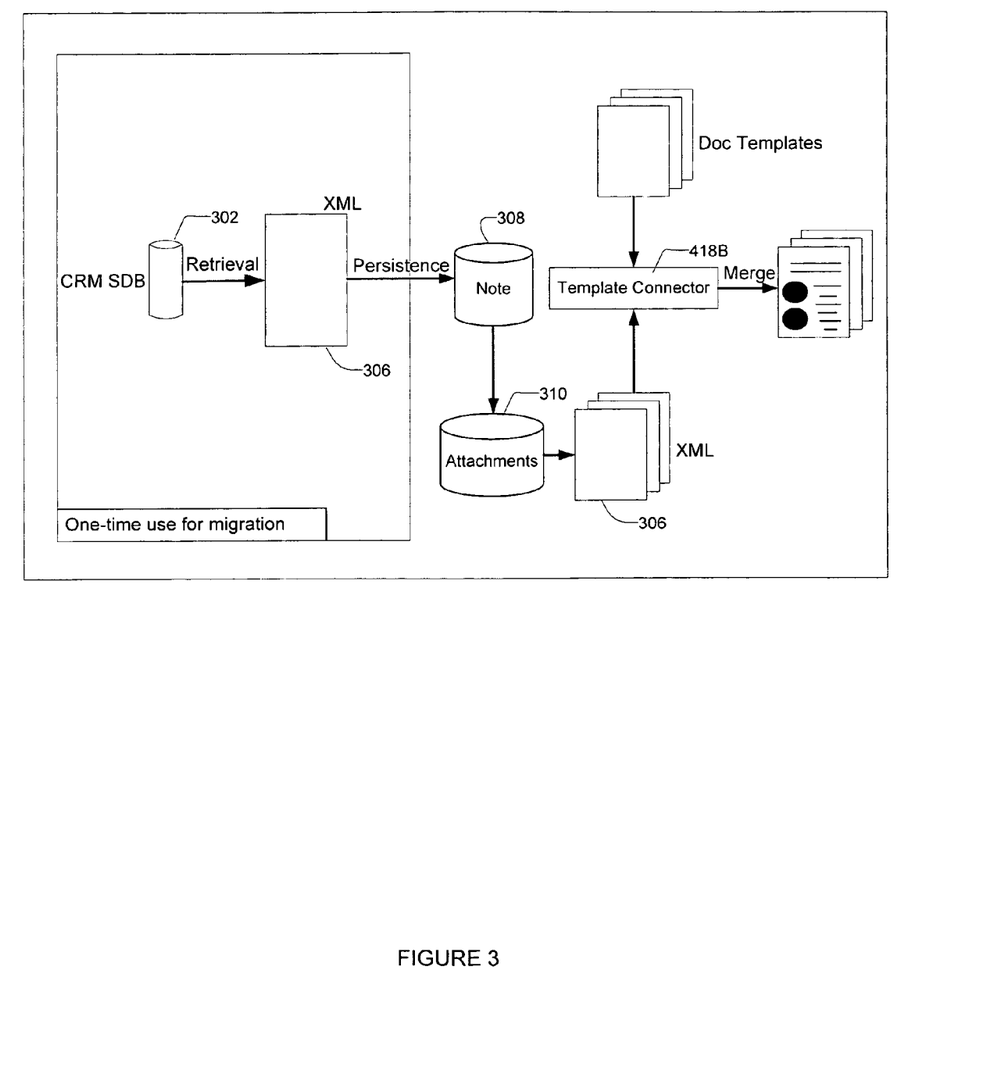
FIG. 3 is a block diagram of a system where legacy knowledge entities are migrated to an exemplary inventive knowledge repository.
Figure 4:
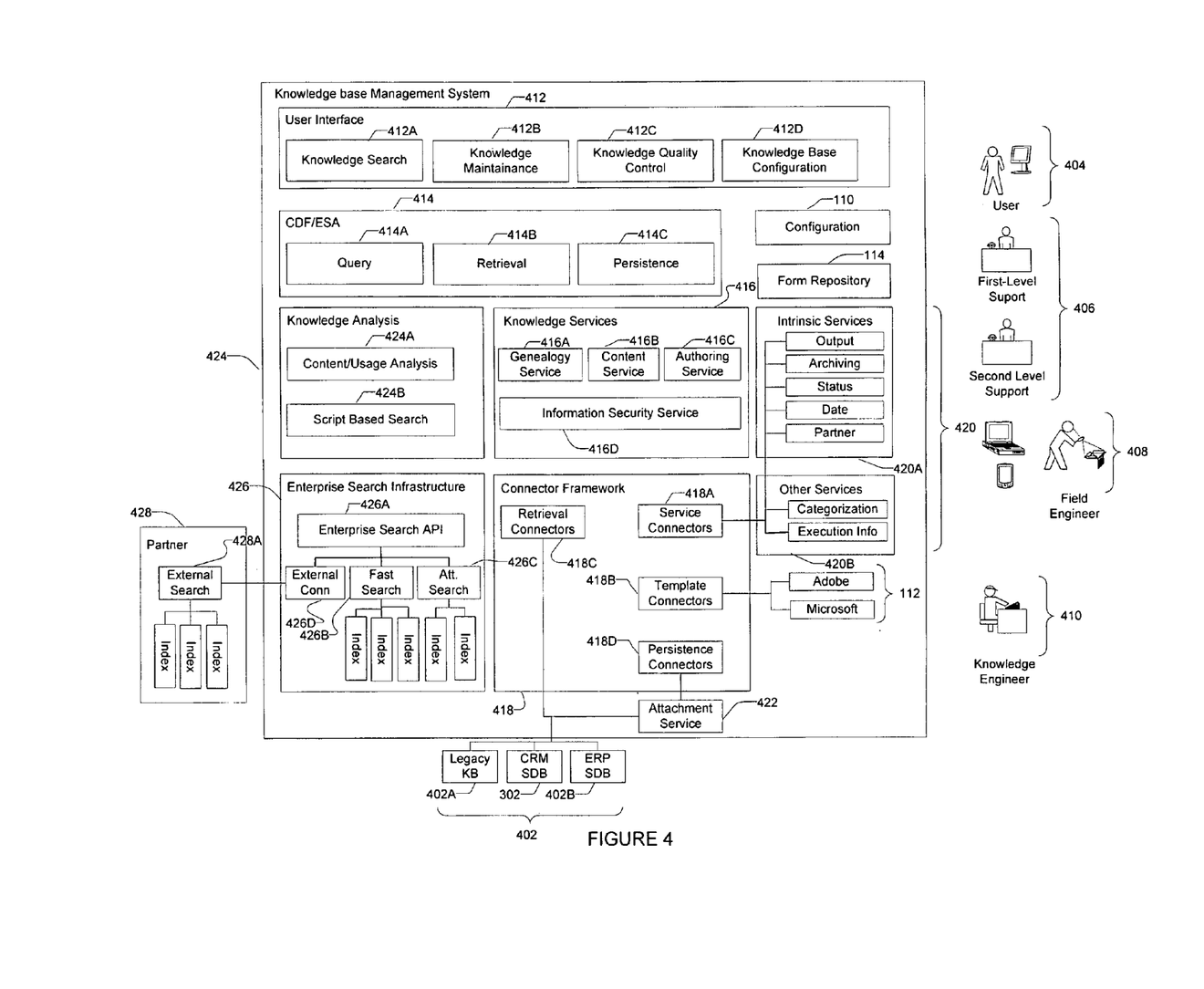
FIG. 4 is a block diagram of another exemplary system that manages a repository of knowledge entities.

FIG. 4 shows a system 400 that manages knowledge entities in one or more knowledge bases 402. The knowledge bases can include a CRM Solution Database (SDB) 302 (to be described below), a legacy knowledge base (KB) 402A or an enterprise resource planning (ERP) SDB 402B, to name a few examples. As in the previous example, the knowledge management here relates to problem descriptions and corresponding solutions, so that users can access the system to find suggested remedies for specific situations.

The system 400 can be used by persons ("users") having various roles. Exemplary roles include a basic user role 404 for users that have first-hand experience of the problem and wish to consult the knowledge repository to find a solution. In some situations, this access of the knowledge repository is referred to as a "self service" because the user is attempting to resolve the problem himself or herself. A support role 406 covers individuals who work in support centers, at help desks, or in similar positions. They receive complaints or questions from users, for example the "service request" mentioned above, and may access the knowledge base to find an answer. The support role may include more than one level of support, where more challenging issues are escalated from a first level-support to a second level-support. A field engineer role 408 covers technicians whose job is to fix problems with the equipment to which the knowledge repository relates. That is, when the knowledge repository relates to the operation of a computer system the technician may be an IT specialist or computer expert; when the knowledge repository relates to the operation of a manufacturing machine the technician may be an engineer or machine specialist, and so on. A knowledge engineer role 410 covers the individual(s) in charge of maintaining the knowledge repository. Their duties may include collecting, reviewing and revising the knowledge that is to be included in the repository as well as the task of ensuring that the repository is provided with knowledge entities corresponding to the knowledge.

The system 400 includes one or more user interfaces (UI) 412. For example:

A knowledge search UI 412A is available for all users to search and access contents of knowledge entities. The UI 412A may be integrated with various business applications, e.g., a service request management module or a case management module, or may be a standalone process. The main functionality of the knowledge search is to bring context related information to compose a search query automatically to retrieve needed information.

A knowledge maintenance UI 412B can be available as a display mode for all users with authorized display access. Only the knowledge engineer should have the editing authorization for the knowledge contents. The knowledge maintenance works with individual knowledge entities and their pre-defined sub-entities, which refer to the corresponding document template.

A knowledge quality control UI 412C is designed for the knowledge engineer as a triggering point to access the list of knowledge entities or service requests that require creation of a new knowledge entity or modification of existing knowledge entities. The list of entities may be pushed from other processes, e.g., an escalated service request from a support representative or a solution correction request submitted from a field engineer.

A knowledge base configuration UI 412D is designed for the knowledge engineer to configure and re-configure the design of a knowledge repository and edit the document templates. The configuration template 110 with a version control may be edited or revised in such an effort. For example, the configuration template may be edited to change how building blocks such as a date validity connector, a business partner connection or a content retrieval connector are used for the knowledge base. As another example, the structure of additional knowledge entities to be created can be changed by adding a new sub-object to the knowledge entities, modifying an existing sub-object of the knowledge entities, or removing an existing sub-object from the knowledge entities. In contrast, the document template may be edited to determine for each node, e.g., for a problem description, what content should be modeled and described in the template. For example, the display format for the knowledge entities can be changed by modifying the document template or substituting a new document template for the document template. Additional user interfaces for editing the document template(s), e.g., Adobe's interactive form editor, may be provided in the system 400.

The system 400 includes one or more general services 414. Such services may be involved in managing the interactions with the user interfaces and other system components. A query service 414A is a generic application programming interface (API) that uses context related information to compose a search query for designated knowledge repositories or search indexes. The query service returns a hit list with basic description, sufficient information to retrieve the details, and additional information for hit list refinements or a summary.

A retrieval service 414B is designed to retrieve one or more knowledge entities with requested formats based on a provided genealogy ID. The results can be one or more knowledge entities in portable document format (PDF), or in their summary form, or in detail forms, or as an XML document.

A persistence service 414C is designed to persist a knowledge entity and its corresponding sub-entities as documents of XML or other formats.

The configuration template 110 may comprise information stored in one or more data tables. Document templates can be stored in the form repository 114. Document templates can be stored in any document or content management system as long as the document template can be accessed within the system 400, for example through an intranet navigation.

In addition to the general services 414, the system 400 may include at least one knowledge service 416. A genealogy service 416A manages all processes related to genealogy identifiers for the knowledge entities. The genealogy service may interpret or compose the genealogy ID for each knowledge entity to be submitted to an end user. The genealogy ID may be embedded in the content of a knowledge entity, e.g., in XML code or in a PDF document.

A content service 416B manages content related processes. For example, it delegates tasks to retrieval and persistence connectors (to be described below), provides proper formats and transformation for the knowledge entity content, or merges multiple knowledge entities into one document. An authoring service 416C manages processes related to authoring of the content.

An information security service 416D manages additional access control needed by the system 400 and in particular by the component(s) thereof relating to knowledge management. The information security service may be designed within one of the knowledge services 416 to allow filtering with the information security of communication for search and retrieval.

The system 400 includes a connector framework 418, so named because it provides connection between system components. The components in the knowledge service(s) may delegate requests to the connector framework. More than one knowledge base may share the same design that the contents are referred to corresponding document templates. The process related information may be modeled in a standard document template or a data model. The process related information is managed by the process related connectors, and the document templates are managed by template related connectors. The configuration template can define which process related connectors or template related connectors should be used by which knowledge base.

One or more service connectors 418A may work with services 420 in the system 400, including intrinsic services 420A such as status service, date service, archiving service and output service, as well as non-intrinsic services 420B such as categorization service and execution information service.

One or more template connectors 418B provide meta-structure information for different types of document templates. The template connectors provide interfacing with the document templates 112. One or more retrieval connectors 418C are used for retrieving detailed information from different template types, e.g., PDF or Word.

One or more persistence connectors 418D work with the knowledge repositories to persist data or content into the data models or document repositories. This may involve use of an attachment service 422 for the attachments 206.

A knowledge analysis module 424 provides advanced functionality. For example a content/usage analysis service 424A performs text mining and data mining processes for content analysis and statistic analysis of the knowledge repository content. A script based search service 424B provides sequential or parallel search activities based on pre-defined scripts.

The query functionality in the system 400 may be based on an enterprise search infrastructure 426 which provides the capability to work with a distributed search infrastructure such as an enterprise search API 426A. The enterprise search infrastructure 426 may provide a fast search service 426B that searches one or more indexes; an attribute search service 426C that searches one or more indexes; and an external connection service 426D that provides searching in a remote "partner" system 428 connected to the system 400, for example using an external search service 428A in the remote system.

The following are examples of processes that may operate in the system 400. A service resolution process contains information that is designed for various administrative processes, knowledge authoring processes, and integration processes. The outcome of this process is used in managing service requests. Multiple categorizations can be assigned to a service resolution for a classification purpose, e.g., to match a categorized service request with a service resolution. Categories for a service request may be assigned by a call center agent, and a knowledge engineer may assign categories for a Solution. Automatic categorization may be used. A status provided from the intrinsic services 420A can be assigned to a service resolution for administration-related processes. A date management service in the intrinsic services 420A can provide information to check date validity of a knowledge entity. A business partner management service in the intrinsic services 420A can provide a mechanism to trigger a knowledge authoring process based on detection of a specific business partner. An archiving service in the intrinsic services 420A can be based on a standard archiving service provided in the system 400 and provide this archiving functionality for the knowledge entities. An audit and trail service in the intrinsic services 420A can support tracking of changes and logs related information. An output management service in the intrinsic services 420A can manage output of the knowledge entity information. A copy-by-reference service in the intrinsic services 420A can support creation of a knowledge entity from a reference object such as a service request. An executive information service can associate a knowledge entity with costing information.

Knowledge entities may have different designs. For example, the knowledge entity 102 (see FIG. 1) includes the basic entity 102A, the content entity 102B, and the process entity 102C. The basic entity 102A is the holder of basic and generic information (sometimes called header information) for the knowledge entity 102. It may be delivered using a pre-defined template and a data model. The name of the basic entity may convey a business meaning of the knowledge repository, e.g., the name can include the term "SDB," "FAQ" or "Note". Under the basic entity, one or more content entity types or process entity types can be defined according to the following guidelines:

A) The content entity type should have a name, e.g., "Problem," and a description.

B) Each content entity type should specify a URL for accessing the document template for a specific language of the entity. The language-dependent document template describes the structure, such as the attributes, of the content entity.

C) The content entity type may specify an optional retrieval connector and an optional persistence connector. Otherwise, a default connector to the attachment service may be used.

D) The content entity type may specify a cardinality. For example, 0:n is used by default, meaning that 0 to n content entities are allowed under the basic entity for the specific content entity type.

E) The process entity type may specify a status of the knowledge entity, for example in relation to an intrinsic service provided by the platform.

F) The process entity type may specify a validity date, such as a date when a knowledge entity expires or becomes valid.

G) The process entity type can specify one or more participants (business partners) relating to the knowledge entity, such as a creator, editor, reviewer, approval administrator, publisher or responsible administrator.

H) The process entity type may specify a categorization service to be used in identifying a possible solution based on a received service request.

The attributes of the basic entity are all related to the basic definition of the knowledge object, e.g., a unique identifier, versions and brief descriptions of the object. The basic entity is represented as a business object in the system 400. Additional sub-entities may be used. The attributes of the basic entity are generic to all knowledge repositories because the attributes will control the administrative process of the knowledge repository.

FIG. 3 shows a system 300 that can perform data migration from a legacy knowledge base or repository of knowledge entities. Legacy knowledge bases may have many data models that are not document-based, so they can not be directly saved as an attachment. In contrast, if the legacy knowledge entity is a pure document without any structure, no conversion is needed and the knowledge entities can be saved as attachments. If the old data model were used, a customer could not change the knowledge entity structure in the old environment because it is a fixed data mode. Rather, after migration the customer can change the structure simply by editing the document template.

Here, the legacy repository is a "solution database" (SDB) originating in a customer relationship management (CRM) system, and is therefore referred to as CRM SDB 302. The person or organization that has been using the CRM SDB wishes to begin using a KR according to the present invention without losing existing SDB contents. One advantage of doing so is that the knowledge administrator—who is already familiar with the existing SDB structure—can continue to work with the look-and-feel of the original structure in the KR. Legacy knowledge entities usually are converted directly into a content node which is defined by the document template.

The one-time data migration process from the legacy repository to the new repository may be performed using the connector framework 418. For the migration, the connection framework may include the content retrieval connector 418C for the retrieval of content from the CRM SDB, and the content persistence connector 418D for the persistence of retrieved content as an attachment in the knowledge entity. The process of persisting the content may involve accessing the configuration template and at least one of the document templates.

An exemplary one-time data migration process includes the following steps:

1. A data migration report is started in the system 300.

2. The configuration template to be used with the CRM SDB 302 is loaded, and the corresponding problem/solution document templates are also loaded.

3. The data migration report initiates a call to the content retrieval connector 418C for the CRM SDB to retrieve the existing SDB contents in batches.

4. For each batch, the retrieved content is represented as generic document content in XML format, and the content is included in an XML document 306.

5. Using the template connector 418B, the contents of the XML document 306 are merged with corresponding respective document templates for problem and solution descriptions.

6. The new knowledge entity is persisted as a note 308 which corresponds to the basic entity 102A. The note may be provided as a template in the system, which is advantageous when information from the basic entity, such as status information, may be required for display.

7. The XML code of the document is persisted as attachments 310 using the attachment service 422. This corresponds to the content entity 102B. The final PDFs may also be persisted into the attachment service 422 using the persistence connector 418D.

8. Steps 4-7 above are repeated until all SDB contents are converted into the new environment.

When the migration is complete, the legacy knowledge content can be viewed using a graphical user interface (GUI) of the system 300. Because the document templates for the problems and solutions can use the same structure as in the legacy repository, the documents containing the problems and solution contents in the new environment can have the same look and feel as in the legacy repository.

Figure 5:
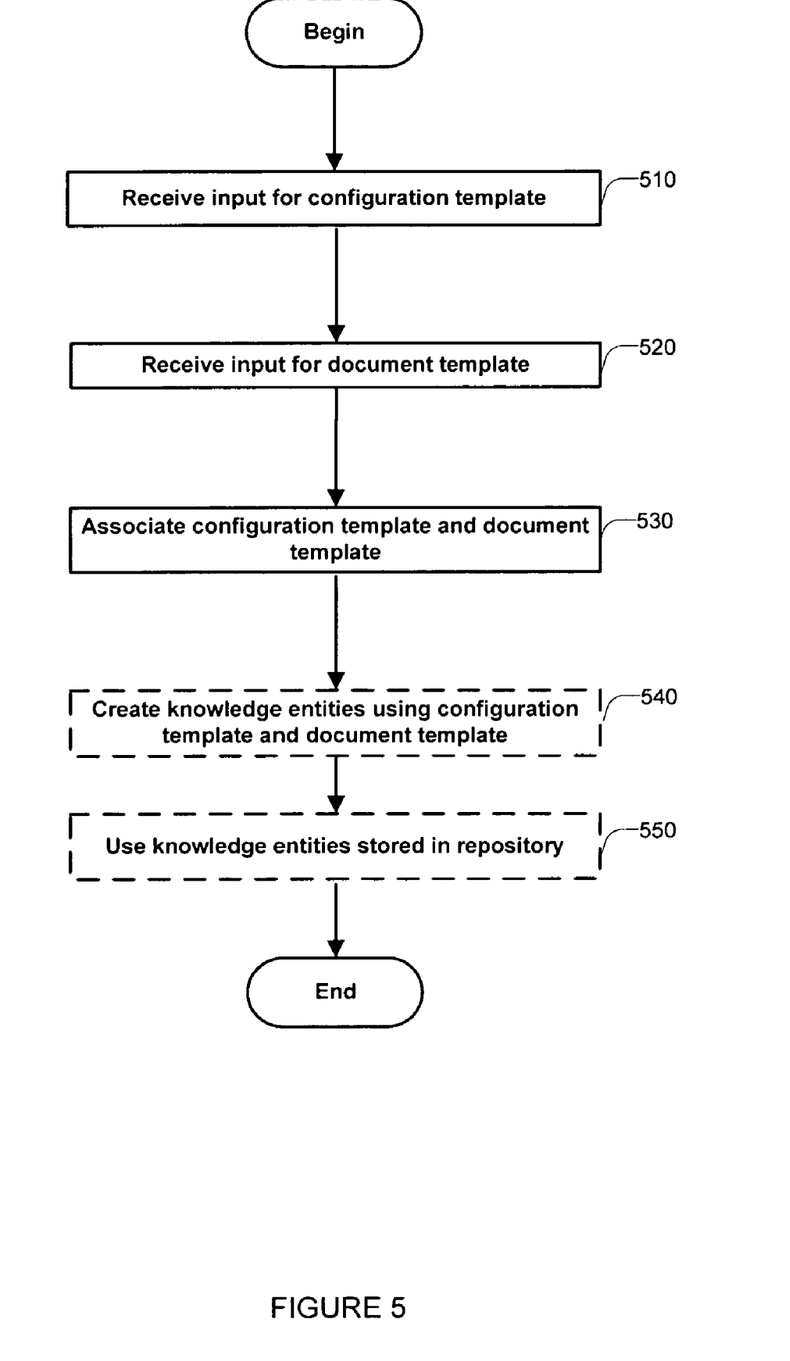
FIG. 5 is a flow chart of an exemplary method.

FIG. 5 shows a flow chart of an exemplary method 500 related to knowledge management. Generally, steps 510-530 relate to designing the knowledge repository, step 540 to placing knowledge entities in the designed repository, and step 550 to using the thus created knowledge repository. The method 500 can be performed using a computer program product, that is, by a processor executing instructions stored in a computer readable medium. The method 500 comprises:

Receiving, in step 510, a first input to form a configuration template for a knowledge repository. The configuration template describes a class of knowledge entities to be included in the knowledge repository. The configuration may also describe the connectors to be used by each knowledge base. For example, information for the configuration template 110 can be received in the system 400 through the knowledge base configuration UI 412D.

Receiving, in step 520, a second input identifying a document template to be used in displaying instances of the class of knowledge entities. The document template is selected from a predefined group of document templates. For example, the document template is selected from the document templates 112, which may include a Microsoft Word template or an Adobe Interactive Form template. Accordingly, this step may be performed upon the user choosing whether to base the knowledge repository on Microsoft Word documents or Adobe Interactive Forms, to name just two examples.

Associating, in step 530, the document template with the configuration template in the computer system. For example, the configuration template 110 may be associated with a Word template to design a knowledge repository that is based on the Microsoft Word format.

Creating, in optional step 540, knowledge entities using the configuration template and the document template. For example, this step can be performed when the knowledge engineer is adding problem or solution descriptions to the repository in form of knowledge entities. For example, when the knowledge entities are based on the Microsoft Word template, a predefined form can be displayed in the GUI for entering the necessary information, the form including separate areas for describing (or entering links to) the problem and the solution(s).

Using, in optional step 550, the knowledge entities stored in the repository. For example, a user having any of the roles 404-410 can access the knowledge repository 104 containing the knowledge entities 102. While accessing the information in a knowledge base, the corresponding connectors may be activated to retrieve process related information, e.g., status, or business partners from designated connectors to fill in the information for the process related nodes 210. Also, the configured document template will be used to merge the XML documents to prepare the content related nodes 208.

A knowledge base is not limited to descriptions of problems and accompanying solutions. The following are other examples of knowledge bases. An animation knowledge base may consist of various 3D designs of created objects, behaviors and restrictions. A legal knowledge base may consist of case details recorded and organized by a law firm. A pharmaceutical knowledge base may consist of experiment diaries, results of bioassays, and simulation trials to design a new drug. An entertainment knowledge base may consist of annotated TV or radio programs or a user's personal preferences. A financial knowledge base may consist of evaluated and practiced hedging strategies. A semiconductor manufacture knowledge base may consist of various designs and recipes to improve yields or future designs. A medical knowledge base may consist of rules for diagnosing different diseases.

Figure 6:
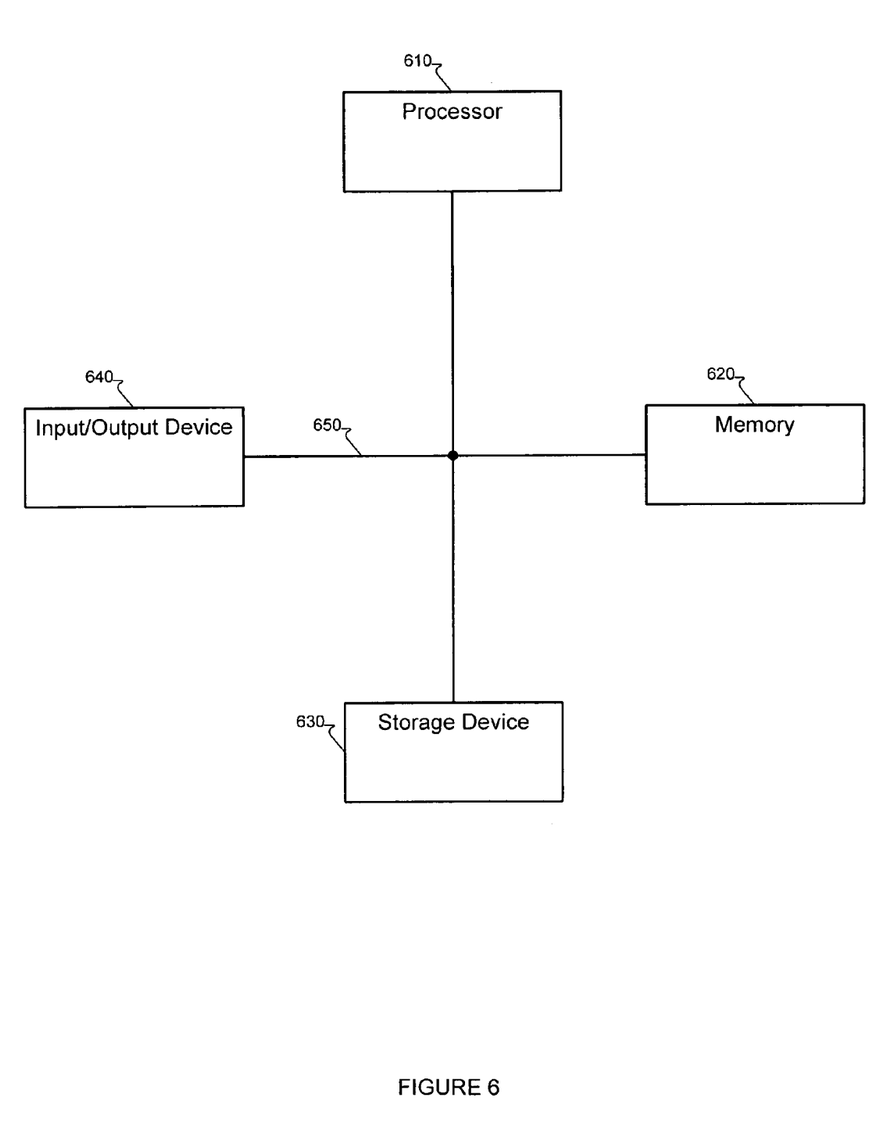
FIG. 6 is a block diagram of a general computer system.

FIG. 6 is a block diagram of a computer system 600 that can be used in the operations described above, for example in the systems 101 or 400. The system 600 includes a processor 610, a memory 620, a storage device 630 and an input/output device 640. Each of the components 610, 620, 630 and 640 are interconnected using a system bus 650. The processor 610 is capable of processing instructions for execution within the system 600. In one embodiment, the processor 610 is a single-threaded processor. In another embodiment, the processor 610 is a multi-threaded processor. The processor 610 is capable of processing instructions stored in the memory 620 or on the storage device 630 to display graphical information for a user interface on the input/output device 640.

The memory 620 stores information within the system 600. In one embodiment, the memory 620 is a computer-readable medium. In one embodiment, the memory 620 is a volatile memory unit. In another embodiment, the memory 620 is a non-volatile memory unit.

The storage device 630 is capable of providing mass storage for the system 600. In one embodiment, the storage device 630 is a computer-readable medium. In various different embodiments, the storage device 630 may be a floppy disk device, a hard disk device, an optical disk device, or a tape device.

The input/output device 640 provides input/output operations for the system 600. In one embodiment, the input/output device 640 includes a keyboard and/or pointing device. In one embodiment, the input/output device 640 includes a display unit for displaying graphical user interfaces. For example, the input/output device can generate any or all GUIs described herein.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of creating a knowledge repository for containing instances of knowledge entities, the method comprising:

receiving, in a computer system, a first input to form a configuration template for a knowledge repository, the configuration template describing a class of knowledge entities to be included in the knowledge repository;

receiving a second input identifying a document template to be used in displaying instances of the class of knowledge entities, the document template being selected from a predefined group of document templates and the configuration template specifying how contents of the instances of the class of knowledge entities are displayed using the selected document template; and creating the knowledge repository by storing at least one of the instances of the class of knowledge entities in the computer system, the document template being associated with the configuration template in the computer system for use in creating a remainder of the instances of the class of knowledge entities.

2. The method of claim 1, wherein the configuration template defines each of the knowledge entities as including a basic entity and a content entity, the content entity to be merged with the document template for displaying the knowledge entity.

3. The method of claim 2, wherein the basic entity is defined as a template.

4. The method of claim 2, wherein the configuration template further defines each of the knowledge entities as including a processing entity to be used in managing an administrative process for the knowledge entity.

5. The method of claim 1, wherein the knowledge entities are based on XML.

6. The method of claim 1, further comprising storing the remainder of the instances of the class of knowledge entities together with the at least on stored instance in the knowledge repository and subsequently merging at least part of any stored knowledge entity with the document template for displaying the stored knowledge entity.

7. The method of claim 6, wherein at least one of the instances results from a migration process from a legacy knowledge repository.

8. The method of claim 7, wherein the migration process comprises retrieving contents from the legacy knowledge repository and persisting the retrieved contents in a format that can be merged with the document template for display.

9. The method of claim 6, further comprising receiving input to change the knowledge repository after storing the instances.

10. The method of claim 9, wherein the change comprises modifying a structure of additional knowledge entities to be created, the modified structure comprising at least one selected from the group consisting of: a) adding a new sub-object to the knowledge entities; b) modifying an existing sub-object of the knowledge entities; and c) removing an existing sub-object from the knowledge entities.

11. The method of claim 9, wherein the change comprises modifying a display format for the knowledge entities, the display format being modified by at least one selected from the group consisting of: a) modifying the document template; and b) substituting a new document template for the document template.

12. The method of claim 1, wherein the configuration template describes a service connector for the knowledge entity, the service connector allowing use of one or more services in the computer system.

13. The method of claim 1, wherein the configuration template describes a content connector for the knowledge entity, the content connector to be used in retrieving and persisting information of the knowledge entity.

14. The method of claim 1, wherein the configuration template describes a template connector for the knowledge entity, the template connector configured for interfacing with the document template.

15. A computer program product tangibly embodied in a computer readable medium, the computer program product including instructions that, when executed, cause a processor to perform operations comprising:

receiving, in a computer system, a first input to form a configuration template for a knowledge repository, the configuration template describing a class of knowledge entities to be included in the knowledge repository;

receiving a second input identifying a document template to be used in displaying instances of the class of knowledge entities, the document template being selected from a predefined group of document templates and the configuration template specifying how contents of the instances of the class of knowledge entities are displayed using the selected document template; and creating the knowledge repository by storing at least one of the instances of the class of knowledge entities in the computer system, the document template being associated with the configuration template in the computer system for use in creating a remainder of the instances of the class of knowledge entities.

16. A computer system for managing a repository of knowledge entities, the computer system comprising:

a knowledge repository tangibly embodied a computer readable medium and having stored therein knowledge entities described by a configuration template, the knowledge entities having a format such that they can be merged with a document template for display; and a knowledge management module tangibly embodied a computer readable medium and that merges at least one of the knowledge entities with the document template.

17. The system of claim 16, wherein the knowledge management module further retrieves additional information and uses it to create an additional knowledge entity for the knowledge repository, wherein the knowledge management module can merge the additional entity with the document template for display.

18. The system of claim 16, wherein the configuration template describes at least one connector that the knowledge management module uses in managing the knowledge entities.

19. The system of claim 18, wherein the at least one connector is selected from the group consisting of: a service connector allowing use of one or more services in the computer system, a content connector to be used in retrieving and persisting information of the knowledge entity, and a template connector configured for interfacing with the document template.

20. The system of claim 16, wherein the format is XML.

\* \* \* \* \*